US009509171B2

(12) United States Patent
Lundgren et al.

(10) Patent No.: US 9,509,171 B2
(45) Date of Patent: Nov. 29, 2016

(54) METHOD AND APPARATUS FOR OPTIMIZING STANDBY POWER CONSUMPTION AND PROVIDING USER INDICATIONS IN WPC BASED WIRELESS CHARGING SYSTEM

(75) Inventors: Mika-Petteri Lundgren, Salo (FI); Mikko Vuori, Nakkila (FI)

(73) Assignee: Nokia Technologies Oy, Espoo (FI)

( * ) Notice: Subject to any disclaimer, the term of this patent is extended or adjusted under 35 U.S.C. 154(b) by 111 days.

(21) Appl. No.: 14/362,912

(22) PCT Filed: Dec. 15, 2011

(86) PCT No.: PCT/FI2011/051111
§ 371 (c)(1),
(2), (4) Date: Jun. 4, 2014

(87) PCT Pub. No.: WO2013/087971
PCT Pub. Date: Jun. 20, 2013

(65) Prior Publication Data
US 2014/0306657 A1 Oct. 16, 2014

(30) Foreign Application Priority Data
Dec. 14, 2011 (WO) .................. PCT/FI2011/051105

(51) Int. Cl.
H02J 7/00 (2006.01)
H02J 7/02 (2016.01)
H02J 7/04 (2006.01)

(52) U.S. Cl.
CPC ................ *H02J 7/025* (2013.01); *H02J 7/045* (2013.01)

(58) Field of Classification Search
CPC ............ H02J 7/04; H02J 7/005; H02J 7/007; H02J 7/008; H02J 7/0025
USPC .................................. 320/108, 132, 137, 149
See application file for complete search history.

(56) References Cited

U.S. PATENT DOCUMENTS 5,159,258 A   10/1992 Kolvites et al.
2009/0096413 A1   4/2009 Partovi et al.
(Continued)

FOREIGN PATENT DOCUMENTS

CN   101971453 A   2/2011
EP   2086085   8/2009
(Continued)

OTHER PUBLICATIONS

"System Description Wireless Power Transfer", Wireless Power Consortium, vol. 1, Version 1.0.3-2, Sep. 2011, 90 pages.
(Continued)

Primary Examiner — Paul Dinh
(74) Attorney, Agent, or Firm — Banner & Witcoff, Ltd.

(57) ABSTRACT

In accordance with an example embodiment of the present invention, a method for reducing standby power consumption of a battery of a wireless charging device comprises: monitoring a presence of the wireless charging device nearby a wireless charger transmitter (460); initiating a wireless charging when the presence of the wireless charging device is detected on the wireless charger transmitter (460) and sending a charging notification to an end user; sending a battery full message for notifying the end user when the wireless charging is complete and terminating the wireless charging; setting the wireless charging device to a standby mode and monitoring a ping signal from the wireless charger transmitter (460); entering a maintenance charging mode when the battery is below a recharging threshold without notifying the end user; and continuing the maintenance charging mode of the wireless charging device until the battery is full or the wireless charging device is removed from the wireless charger transmitter (460).

6 Claims, 5 Drawing Sheets

(56) References Cited

U.S. PATENT DOCUMENTS

| | | |
|---|---|---|
| 2009/0140690 A1 | 6/2009 | Jung |
| 2010/0026236 A1 | 2/2010 | Kamiyama et al. |
| 2010/0084918 A1 | 4/2010 | Fells et al. |
| 2011/0006611 A1 | 1/2011 | Baarman et al. |
| 2011/0018679 A1 | 1/2011 | Davis et al. |
| 2011/0127843 A1 | 6/2011 | Karaoguz et al. |
| 2012/0299389 A1* | 11/2012 | Lee ............... H04B 5/0031 307/104 |
| 2014/0302782 A1* | 10/2014 | Raab ............... H04B 5/0037 455/41.1 |

FOREIGN PATENT DOCUMENTS

| | | |
|---|---|---|
| JP | 2011062028 | 3/2011 |
| WO | 2005/109597 A1 | 11/2005 |

OTHER PUBLICATIONS

International Search Report and Written Opinion received for corresponding Patent Cooperation Treaty Application No. PCT/FI2011/051106, dated Aug. 23, 2012, 13 pages.

Office action received for corresponding Chinese Patent Application No. 201180076375.0, dated Dec. 4, 2015, 7 pages of office action and no pages of office action translation available.

International Search Report and Written Opinion received for corresponding Patent Cooperation Treaty Application No. PCT/FI2011/051111, dated Mar. 12, 2012, 13 pages.

Extended European Search Report received for corresponding European Patent Application No. 11877542.8, dated Mar. 18, 2016, 7 pages.

* cited by examiner

METHOD AND APPARATUS FOR OPTIMIZING STANDBY POWER CONSUMPTION AND PROVIDING USER INDICATIONS IN WPC BASED WIRELESS CHARGING SYSTEM

RELATED APPLICATION

This application was originally filed as PCT Application No. PCT/FI2011/051111 filed Dec. 15, 2011, which claims priority to International Application No. PCT/FI2011/051105 filed Dec. 14, 2011.

TECHNICAL FIELD

The present application relates generally to the charging of electronic devices and more particularly to methods and apparatuses for optimizing standby power consumption in WPC based wireless charging.

BACKGROUND

Currently, after a phone handset is fully charged with a wireless charger or a transmit TX pad, which is also called wireless charger pad, the charging pad is switched to a standby mode by a Receiver Integrated Circuit RX IC which is also referred as a handset wireless charger IC inside the handset. The handset loses connection to the TX pad because the RX IC inside the handset gets all the energy from TX pad. This will become an issue when a maintenance charging phase occurs since the handset does not know if it is still on the TX pad or not, after the charging process is complete. The SW is not able to show the correct User Interface indication when the handset will need to be charged again after the battery voltage of the handset drops below a recharging threshold.

Therefore, in one of the scenarios, once the battery is fully charged, and if the end user may still leave the phone on the wireless charger pad and the maintenance charging mode may be needed. The issue is how to distinguish the maintenance charging phase from initial charging in order to enable the correct user indications (battery full even if the maintenance charging is ongoing).

In some earlier solutions, the wireless charger receivers have not been switched to standby mode after the battery is full. Therefore, the RX IC inside the handset remains active or stays alive during all the time that the handset is on the TX pad or the wireless charger. The tradeoff is huge power consumption (~1.5 W) without doing anything, which is a waste of energy for the handset. The normal wall adapters consume less than 50 mW when those are not loaded (battery full). Therefore, a consumption of ~1.5 W in standby current is not acceptable in the long run—especially when the handsets are kept on the wireless charger for long periods over night or over weekend.

The reason of this lack of user interface friendly environment is that inbuilt wireless charging in handsets is still at its early stage and these kinds of issues are still to be addressed.

SUMMARY

Various aspects of examples of the invention are set out in the claims.

In one example of embodiment, after the charging process has been completed, the handset phone or electrical device commands the wireless transmitter or the wireless charger pad to enter the stand-by mode, and while the wireless transmitter sends ping signals regularly. If the handset phone or the electrical device detects these ping signals, it determines that the handset phone or the electrical device is still on the wireless transmitter or the wireless charger pad. If the battery of the handset or the electrical device needs to be charged again, the handset or the electrical device will enter the maintenance charging mode without notifying the end user about the maintenance charging.

According to a first aspect of the present invention, an apparatus comprises at least one processor and at least one memory including computer program code, wherein the at least one memory and the computer program code are configured to, with the at least one processor cause the apparatus to perform at least the following: monitoring a presence of the wireless charging device nearby a wireless charger transmitter; initiating a wireless charging when the presence of the wireless charging device is detected on the wireless charger transmitter and sending a charging notification to an end user; sending a battery full message for notifying the end user when the wireless charging is complete and terminating the wireless charging; setting the wireless charging device to a standby mode and monitoring a ping signal from the wireless charger transmitter; entering a maintenance charging mode when the battery is below a recharging threshold without notifying the end user; and continuing the maintenance charging mode of the wireless charging device until the battery is full or the wireless charging device is removed from the wireless charger transmitter.

According to a second aspect of the present invention, a method for reducing standby power consumption of a battery of a wireless charging device comprises: monitoring a presence of the wireless charging device nearby a wireless charger transmitter; initiating a wireless charging when the presence of the wireless charging device is detected on the wireless charger transmitter and sending a charging notification to an end user; sending a battery full message for notifying the end user when the wireless charging is complete and terminating the wireless charging; setting the wireless charging device to a standby mode and monitoring a ping signal from the wireless charger transmitter; entering a maintenance charging mode when the battery is below a recharging threshold without notifying the end user; and continuing the maintenance charging mode of the wireless charging device until the battery is full or the wireless charging device is removed from the wireless charger transmitter.

According to a third aspect of the present invention, a computer program product comprises a computer-readable medium bearing computer program code embodied therein for use with a computer, the computer program code comprising: code for monitoring a presence of the wireless charging device nearby a wireless charger transmitter; code for initiating a wireless charging when the presence of the wireless charging device is detected on the wireless charger transmitter and sending a charging notification to an end user; code for sending a battery full message for notifying the end user when the wireless charging is complete and terminating the wireless charging; code for setting the wireless charging device to a standby mode and monitoring a ping signal from the wireless charger transmitter; code for entering a maintenance charging mode when the battery is below a recharging threshold without notifying the end user; and code for continuing the maintenance charging mode of the wireless charging device until the battery is full or the wireless charging device is removed from the wireless charger transmitter.

According to a fourth aspect of the invention, a computer-readable medium may be encoded with instructions that, when executed by a computer, perform: monitoring a presence of the wireless charging device nearby a wireless charger transmitter; initiating a wireless charging when the presence of the wireless charging device is detected on the wireless charger transmitter and sending a charging notification to an end user; sending a battery full message for notifying the end user when the wireless charging is complete and terminating the wireless charging; setting the wireless charging device to a standby mode and monitoring a ping signal from the wireless charger transmitter; entering a maintenance charging mode when the battery is below a recharging threshold without notifying the end user; and continuing the maintenance charging mode of the wireless charging device until the battery is full or the wireless charging device is removed from the wireless charger transmitter.

According to a fifth aspect of the invention, a method for operating a wireless charger receiver chip comprises: receiving, in a wireless power receiver, wireless power from a wireless power transmitter of a wireless charging platform; transmitting, to the wireless power transmitter, a battery full message to indicate completed charging; detecting a ping signal sent by the wireless power transmitter and determining that the wireless power receiver is still located on the wireless charging platform; and in response to not detecting a ping signal during a predetermined time period, transmitting an interrupt signal to a power controller to indicate that the wireless charger receiver is not located on the wireless charging platform

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
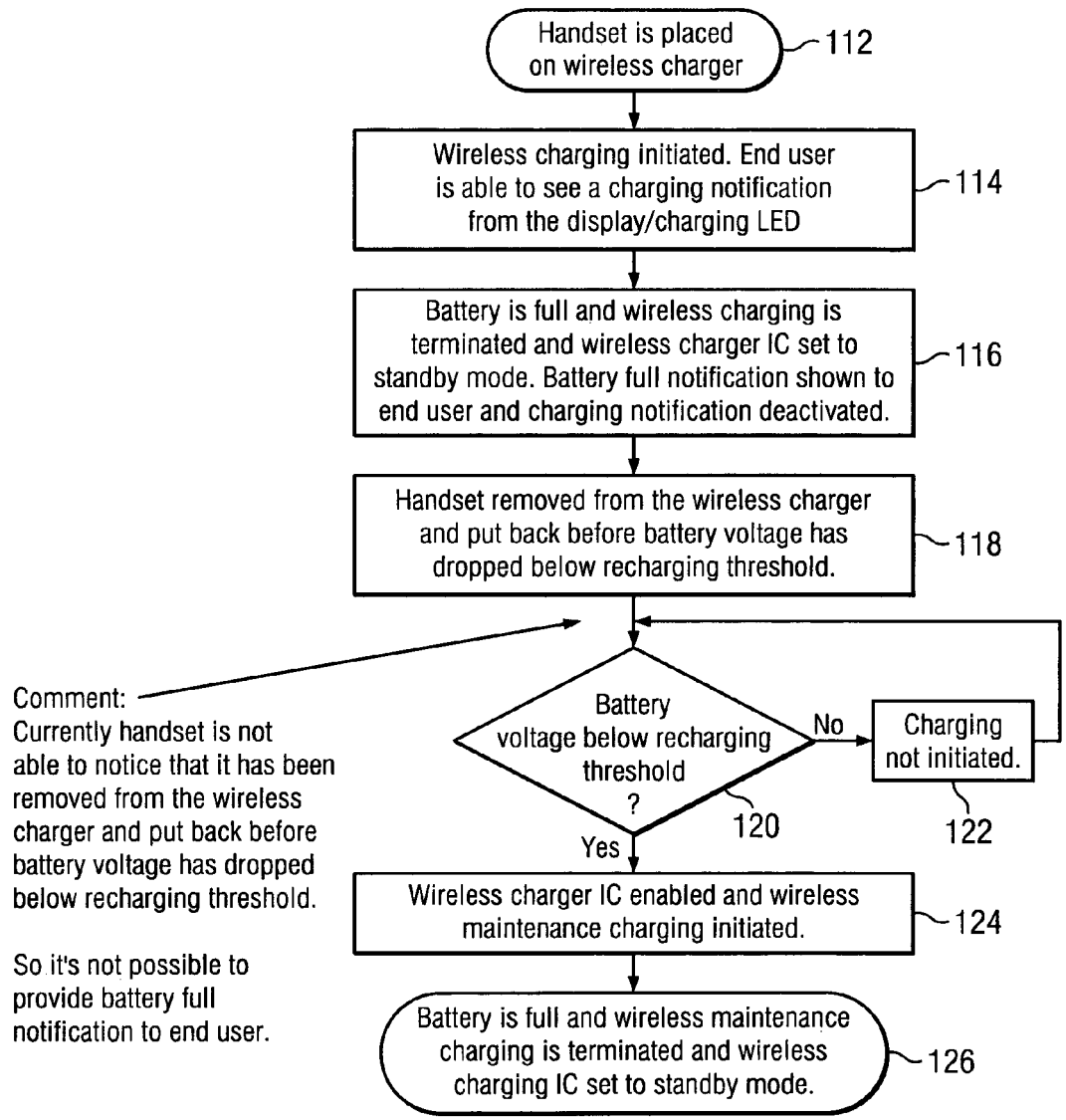
FIG. 1 shows an example of current handset behavior charged using wireless charger when a fully charged handset is removed from a wireless charger and returned back to the wireless charger before the handset battery voltage has dropped below a recharging threshold.

An example embodiment of the present invention and its potential advantages are understood by referring to FIGS. 1 through 5.

The present invention uses analog and/or digital pinging signals provided by a TX pad or a wireless charger transmitted every 500 ms in standby mode in the exemplary embodiment. Any other duration might be used as well except that power consumption will be different. Analog and digital pinging features are specified by the Wireless Power Transfer WPC standards. These ping signals are provided to detect and to locate the handset or the electrical device on a charging pad coupled to the wireless charging pad or the wireless charger transmitter (TX).

The implementation of the analog and digital pinging features can be performed in different embodiments. The advantage of using the analog or digital ping signal is the ability to determine if handset is still on TX PAD. This can be advantageous, for example, when battery is full and RX IC is in standby mode. WPC also defines the usage of pinging signals in the TX to determine whether an object is placed on the pad and whether the possibly detected object is operable for wireless charging. It is also be noted that with the analog pinging, the RX IC needs to be powered by the I/O voltage while with digital ping the RX IC may use the power delivered by the power transmitter.

During the pinging phase, the wireless charger transmitter also called the Power Transmitter executes a Digital Ping, and listens for a response. If the wireless charger transmitter Power Transmitter discovers a wireless charger receiver also called a Power Receiver, the wireless charger transmitter may extend the Digital Ping, i.e. maintain the Power Signal at the level of the Digital Ping.

According to an example embodiment of the invention, by detecting the presence of either one of these two pinging signals, a wireless charging receiver integrated circuit (RX IC), or a wireless charger receiver, can provide a status signal or an indication signal to handset processor to indicate that the wireless charger is located nearby the charger and/or is ready to receive power from the wireless charger transmitter. Alternatively, or additionally, if the wireless charger receiver does not detect one or both of the ping signals, it may send an interrupt signal, for example to a power management ASIC or a power controller of the handset. In general, the power controller may receive an interrupt signal each time the handset or the electrical device is removed from the wireless charger pad or located again on the wireless charger pad. If the interrupt signal is detected after completed charging, the power controller may determine that the handset is not located on the charging pad anymore. On the other hand, if no interrupt is received, the power controller may determine that the handset is still located on the charging pad. When using the ping and/or interrupt signals, for example as described above, the wireless charging system can utilize as low standby power consumption as possible when it is not a charging process and at the same time the processor will not lose the connection to TX pad or the wireless charger pad. The analog and digital pinging signals will enable the handset SW to provide correct User Interface indications to the end users in order to create a more friendly User Interface environment and especially a more efficient environment.

Analog and digital pings are different embodiments. With analog pinging the RX IC needs to be powered by the I/O voltage. With digital ping the RX IC may use the power delivered by the power transmitter.

The advantage of detecting analog or ping signal is the ability to determine if handset is still on TX PAD when charging has been complete, the battery is full, and the RX IC is in standby mode. The Wireless Power Transfer standards, referred as WPC, define the usage of analog and digital ping signals.

According to the present invention, analog and digital ping signals are used to detect the presence of a handset on a wireless charger and more particularly to detect whether the handset is removed from the wireless charger once the battery is/was fully charged. In that way, the handset is able to notify the end user that the handset battery is full, even if the battery needs maintenance charging and it is still placed on the charging pad. The maintenance charging mode may be determined by comparing the battery voltage or the charge level to a recharging threshold. If the handset is not removed from the wireless charger, no notifications during the maintenance charging is shown to the end user (for example no notifications during night time) because no interrupt is generated since the wireless power receiver detects ping signals from the transmitter.

In an exemplary implementation of at least one analog or digital ping signals in a wireless charging process and apparatus, a processor or a power management ASIC of the handset and more specifically the RX IC of the handset is able to generate interrupt signals in case the handset is removed from the wireless charger once the handset battery is fully charged or during the maintenance charging phase. The SoftWare implementation can be performed according to FIG. 3B. An example of a simplified illustration of the HardWare connections is illustrated in FIG. 4. The processor comprises at least one memory that contains executable instructions and computer program code.

Clear notifications of the handset along with clear implementation will prevent unnecessary notifications to the end user. For example, there are no frustrating notifications during night time because no notifications will be shown when the handset is entering the maintenance charging phase.

This present invention also ensures that the end user gets all basic or necessary information. For example, notifications that the battery is full once the handset is fully charged, and notifications that no charging is ongoing because the battery is full i.e. the battery voltage is above the recharging threshold. In the same way, the end user also gets all basic or necessary information on when the fully charged handset is removed from the wireless charger and returned back to the wireless charger before the handset battery voltage has dropped below a recharging threshold. Also, the end user gets appropriate information in the case where the end user has left the handset on the wireless charger and the maintenance charging mode is entered. In this case, the handset may display information indicating that the battery is full, even if the maintenance charging would be ongoing.

FIG. 1 shows an existing behavior of a wireless charging process when a fully charged electrical device or a handset is removed from the wireless charger and returned back before the handset battery voltage has dropped below the recharging threshold.

At step 112, the electrical device or handset is placed on a wireless charger.

At step 114, the wireless charging is initiated from the wireless charger. The end user is able to see a charging notification from the display/charging screen which can be a LED or any other type of display notification of the wireless charger receiver or the handset itself.

At step 116, once the battery of the electrical device or handset is fully charged, the wireless charging initiated by the wireless charger is terminated. Hence, the wireless charging IC is set to a standby mode and the charging notification is deactivated.

At step 118, the wireless charger detects that the electrical device or handset is removed from the wireless charger and returned back to the wireless charger before the handset battery voltage has dropped below recharging threshold. Without the implementation of the present invention, the handset or the electrical device is not able to detect that it has been removed from the wireless charger and returned back to the wireless charger, which results in the end user not being informed by a battery full notification.

At step 120, it is tested whether the battery voltage is below recharging threshold. If it is not, the charging process is not initiated at step 122. And the battery voltage is periodically tested until it detected that the battery voltage is below the recharging threshold. In which case, at step 124, the wireless charger IC is enabled and the wireless charging process is initiated.

The electrical device or the handset is charged until the battery is full. At which step 126, the wireless charging process is terminated and the wireless charging IC is set to standby mode.

Figure 2:
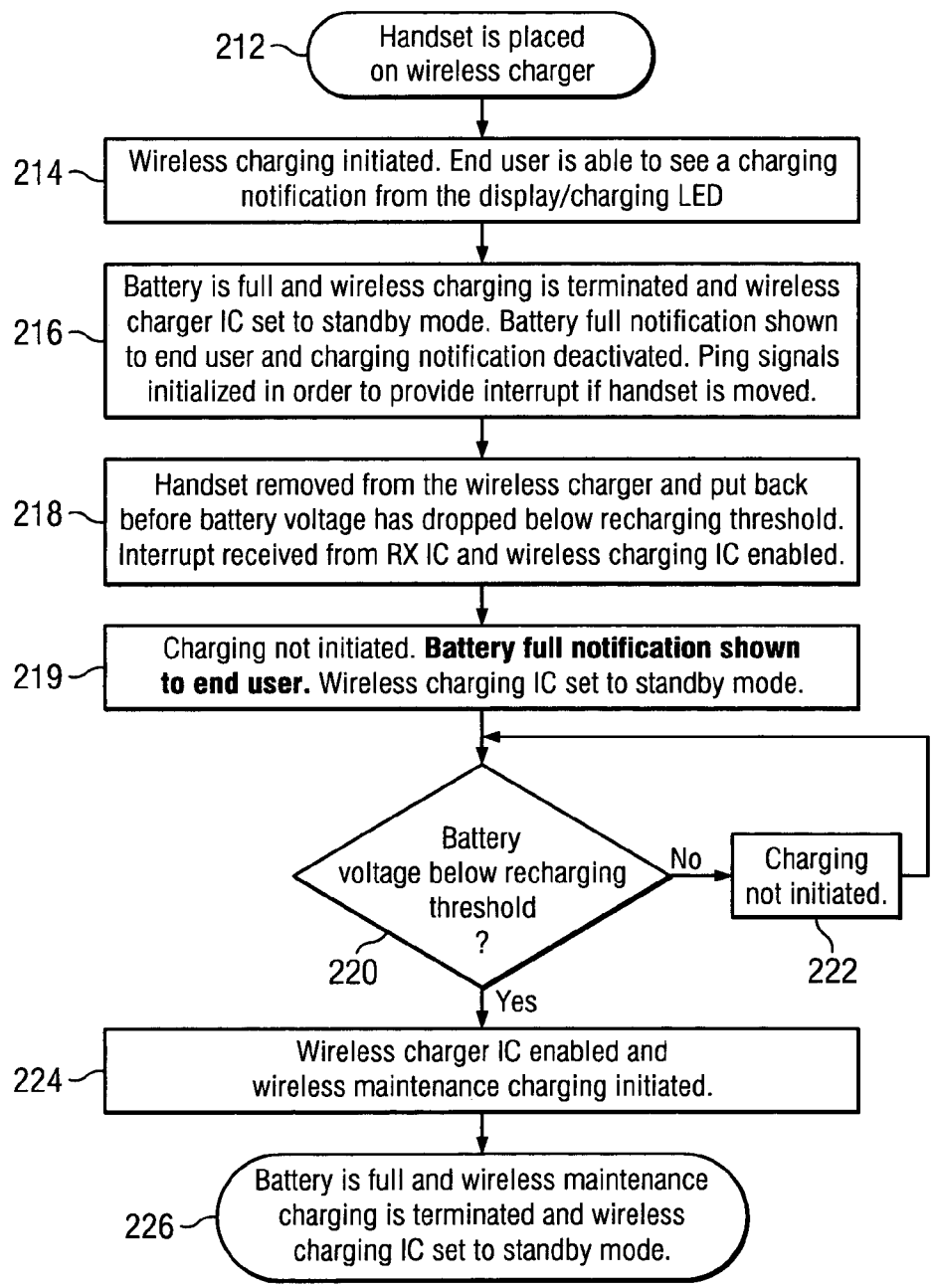
FIG. 2 shows an example of behavior of an analog and digital pinging signals assisted handset when a fully charged handset is removed from the wireless charger and returned back to the wireless charger before the handset battery voltage has dropped below a recharging threshold.

FIG. 2 shows a behavior of wireless charging assisted with the analog and digital ping signals when a fully charged handset is removed from a wireless charger and put back before the handset battery voltage has dropped below recharging threshold.

At step 212, the handset is placed on the wireless charger which can be any type of connection-less charging system receiving power from a power source. The wireless charger or the connection-less charging system is able to convert the received power into a power signal that could be received by a transducer circuit of the handset. The transducer is able to convert the power signal into a form of energy that could be stored in the handset battery. Such power signal capable of transporting energy without requiring connection or physical structure is known in the art.

At step 214, the wireless charging procedure is initiated. The end user receives a charging notification on the display/charging LED or any other type of display notification of the wireless charger receiver or the handset itself.

At step 216, after a certain time of charging, the battery is full and the wireless charging process is terminated. At the same time, the wireless charging IC is set to a standby mode. The battery full notification is shown to the end user and the charging notification is then deactivated. The analog and digital signal(s) is (are) then initialized to provide an interrupt signal if it is detected that the handset is moved.

The handset is then removed from the wireless charger or the connection-less charging system and returned back before the handset battery voltage has dropped below recharging threshold. At which step 218, an interrupt signal is received from the RX IC or the wireless charger receiver and the wireless charging IC is then enabled.

Since the handset battery voltage has not dropped below recharging threshold, the charging process is not initiated and a battery full notification is shown to the end user. The wireless charging IC is set to the standby mode at step 219.

At step 220, it is determined if the battery voltage is below a charging threshold?

At step 222, if the battery voltage is above the charging threshold, the charging process is not initiated.

At step 224, if the battery voltage is below the charging threshold, the wireless charger IC is enabled and the wireless maintenance charging process is initiated.

At step 226, once the battery is full, the wireless maintenance charging process is terminated and the wireless charging IC is set to the standby mode.

When the handset is to be in the maintenance charging mode, no charging notifications are shown to the end user. Therefore, no battery full notification is shown to the end user after the maintenance charging mode.

Figure 3A:
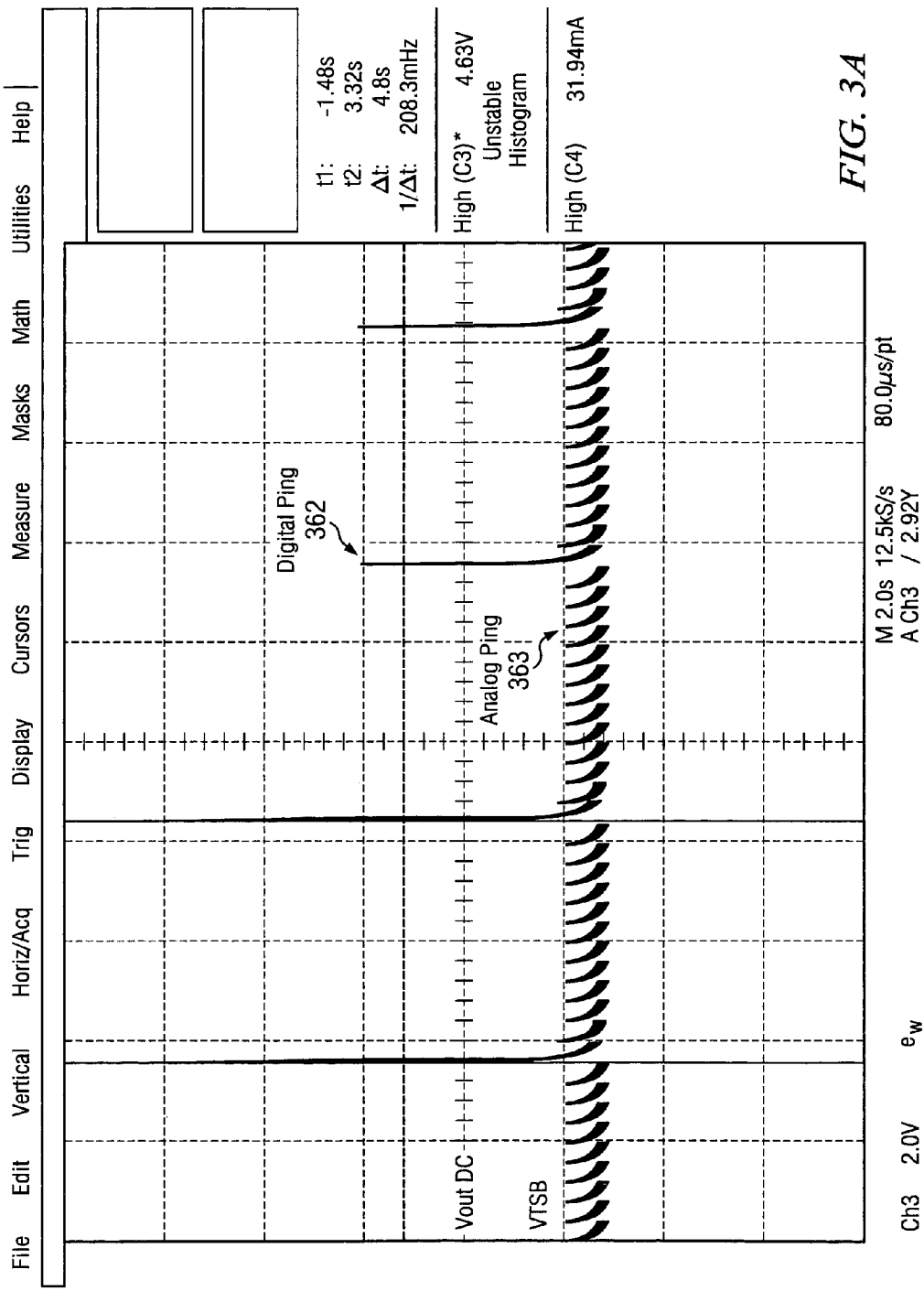
FIG. 3A shows an example of analog and digital pinging signals measured/detected by the Receiver Integrated Circuit RX IC.

FIG. 3A shows an example of analog and digital pinging signals measured from the RX IC.

Analog and digital ping signals 351, 352 are generated by the TX PAD using its electronics and primary coil. RX IC of the handset receives ping signals 351, 352 via a secondary coil.

The digital ping signal 352 carries enough energy to supply the RX IC and RX IC responds to the TX PAD according to spec. Digital ping signal 352 is meant for initializing communication between the TX PAD and RX IC.

The analog ping signal 351 doesn't carry enough energy to supply the RX IC and therefore the RX IC needs external power supply when handset is fully charged and RX IC set to standby mode in order to detect analog ping signal and communicate status to the host. The analog ping signal is meant for discovering and locating objects on the surface of TX PAD.

At the current stage, the Wireless Power Transfer WPC standards do not define any other ping signal than these two analog and digital ping signals. However, any other analog or digital signals can be used as long as they carry some sort of energy and as long as they can be regularly generated by the wireless charger transmitter or the wireless charger power in addition to the fact they analog and digital signals can be used to discover and locate objects on the surface of TX PAD and to initialize communication between TX PAD or the wireless charger transmitter 460 and RX IC or the wireless charger receiver 450. According to an embodiment of the invention, the RX IC may request the TX pad to enter a particular mode, e.g. a standby mode and provide pinging parameters for the TX. These parameters may include e.g. a type or an energy level of the ping signals, a specified time interval between the ping signals, or a maximum allowed time between the ping signals.

Figure 3B:
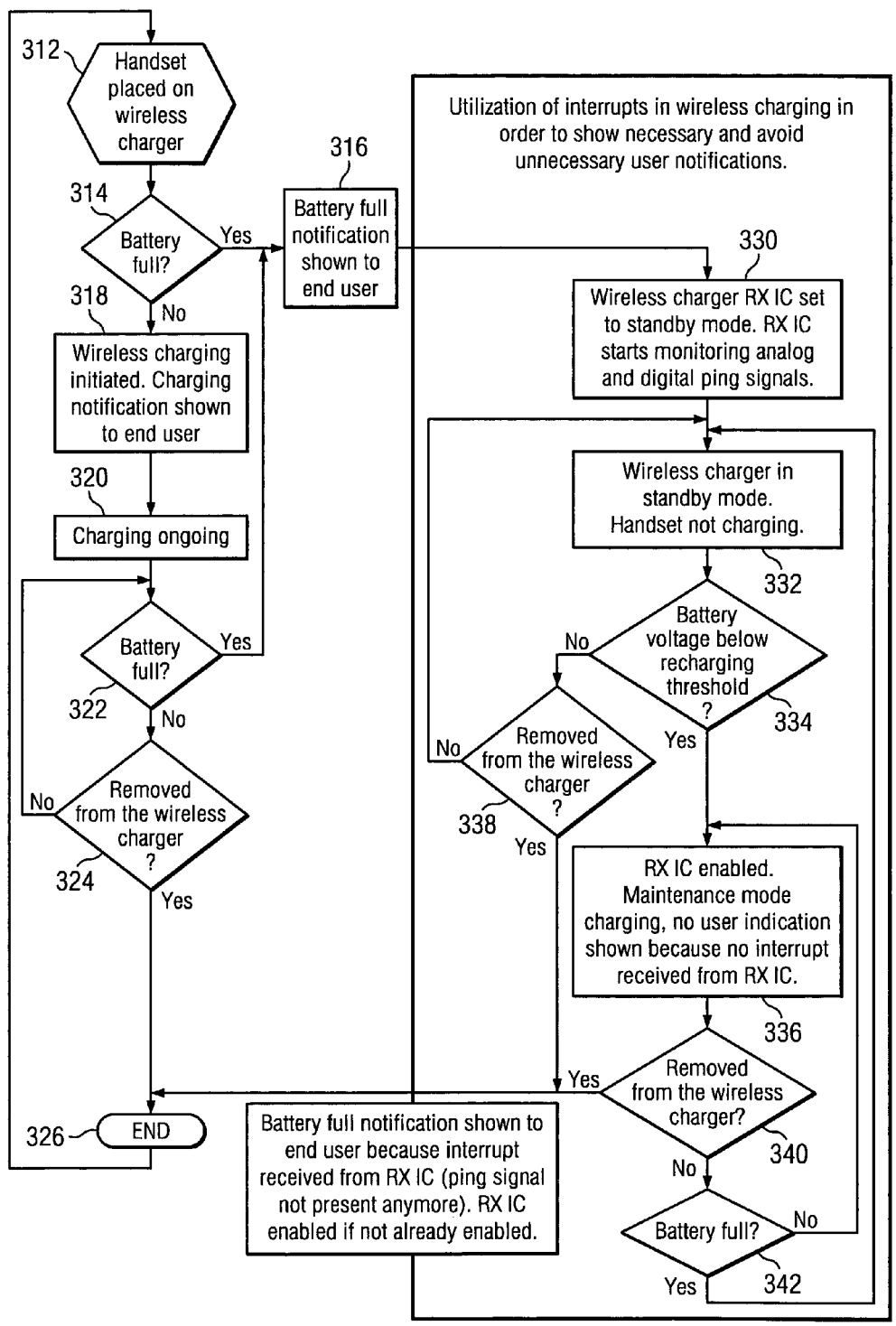
FIG. 3B shows an example of a flow diagram illustrating the charging states of the wireless charger using the analog and digital pinging signals in low power standby mode.
Figure 4:
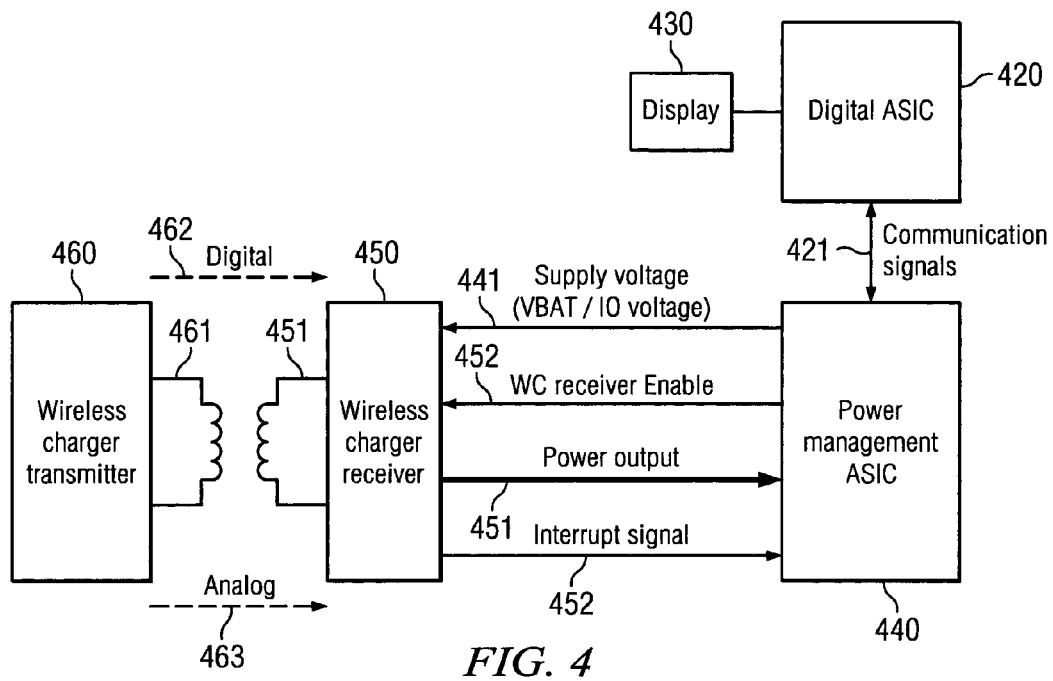
FIG. 4 shows an example of HW connections inside the handset as well as inside the wireless charger.

FIG. 3B shows an example of a SW and HW implementation in a flow chart and more particularly the charging states with the wireless charging process assisted with the analog and digital ping signals.

In the beginning (Phase "Handset placed on wireless charger") the TX makes analog pinging to detect whether something is on the charging pad or not. If it finds that there's some object on the pad. It continues with digital pinging. If the RX device responds to the digital ping, the TX starts charging.

After the battery is full, the RX continues to listen to the ping signals 351, 352 (either analog or digital). This is in the stage "Wireless charger in standby mode. Handset not charging" The ping signals 351, 352 are used to detect whether the RX device is still located on the charging pad so this contributes to the decision "Removed from the wireless charger?"

At step 312, a handset is placed on a wireless charger or a connection-less charging system.

At step 314, it is determined if the handset battery is full?

At step 316, if the handset battery is full, a battery full message is shown to the end user.

At step 318, if the handset battery is not full, the wireless charging process is initiated and the charging notification can be read by the end user.

At step 320, the charging process is ongoing until the handset battery is full.

At step 322, it is determined if the handset battery is full?

If the battery is full, the battery full notification is shown to the end user at step 316.

If the battery is not full yet, at step 324, it determined if the handset is removed from the wireless charger or the connection-less charging system.

If the handset is not removed from the wireless charger or the connection-less charging system, the handset battery continued to be tested periodically if it is full at step 322 or if the handset is removed from the wireless charger or the connection-less charging system at step 324.

If the handset is removed from the wireless charger or the connection-less charging system, the process then ends at step 326.

Once the battery full notification is shown to the end user at step 316, the wireless charger RX IC may be set to standby mode. The RX IC starts monitoring analog and digital ping signals 351, 352 at step 330. These analog and digital ping signals are utilized in the wireless charging process in order to avoid unnecessary or misleading user notifications. These analog and digital ping signals which can be for instance used either alone or combined. They are implemented inside the wireless charger transmitter or the wireless charger pad to detect the presence or the motion of the handset or the electrical device.

At step 332, the wireless charger or the connection-less charging system is in standby mode and no current is provided to the phone handset or the electrical device which are not charging.

At step 334, it is determined whether the battery voltage is below a recharging threshold?

If it is below the recharging threshold, at step 336, the RX IC is enabled.

The maintenance charging mode is entered. There is no user indication shown since no interrupt is received from the RX IC. In this way there is not waste of energy by not notifying to the end user on the handset or electrical device display. This enables also better user experience.

At step 340, it is determined whether the handset is removed from the wireless charger or the connection-less charging system. The decision may be based on the interrupt signal. If the wireless power receiver does not detect one or more ping signals, e.g. during a predetermined time interval, it may send the interrupt signal. Upon receiving the interrupt signal after completed charging the handset, or a component of the handset, may determine that it has been removed from the charging pad. If no interrupt signal has been received after completed charging, the handset, or a component of the handset, may determine that it is still located on the charging pad and charging in maintenance mode should be started if battery charge level drops below the recharging threshold.

If it is removed from the wireless charger or the connection-less charging system, the process ends at step 326 and indication of the battery level is shown to the end user because an interrupt is received from the RX IC (ping signals 351, 352 not present any more). The RX IC may be enabled if not already enabled.

If it is not removed from the wireless charger or the connection-less charging system, it is further determined whether the battery is full at step 342.

If the battery is full, the process loops back to step 332, where the wireless charger or the connection-less charging system is in standby mode and no current is provided to the phone and the handset or the electrical device is not charging.

If the battery is not full, the process loops back to step 336, where the RX IC is enabled. The maintenance charging mode is entered. There is no user indication shown since no interrupt is received from the RX IC.

On the other hand, if the battery voltage is not below the recharging threshold at step 334, it is further determined whether the handset is removed from the wireless charger or the connection-less charging system at step 338.

If it is not removed from the wireless charger or the connection-less charging system, the process loops back to step 332, where the wireless charger or the connection-less charging system is in standby mode and no current is provided to the phone and the handset or the electrical device is not charging.

If the handset is removed from the wireless charger or the connection-less charging system, the process ends at step 326 and the battery full message is shown to the end user because an interrupt is received from the RX IC (ping signal 363, 362 not present any more). The RX IC is enabled if not already enabled.

FIG. 4 shows a simplified example illustration of HW connections of an electrical device or a handset with a wireless charger receiver to detect the analog and digital ping signals.

The analog and digital ping signals 351, 352 are generated by the TX PAD or wireless charger transmitter 460 using an electronic circuit and a primary coil 461. The RX IC or wireless charger receiver 450 of the handset receives ping signals 351, 352 via a secondary coil 451. The digital ping signal 352 carries enough energy to supply the RX IC 450 and RX IC 450 responds to the TX PAD 460 according to Wireless Power Transfer standards WPC. Digital ping signal 352 is meant for initializing communication between the TX PAD 460 and RX IC 450.

The analog ping signal 351 doesn't carry enough energy to supply the RX IC 450 and therefore the RX IC 450 needs external power supply when the handset is fully charged and RX IC 450 set to standby mode in order to detect the analog ping signal 351 and communicate the status to the host. The analog ping signal 351 is meant for discovering and locating objects on the surface of TX PAD or wireless charger transmitter 460.

The Display 430 is connected to digital ASIC. One of the functions of the display 430 is to show the charging notifications (for example: charging ongoing and battery full) to the end user.

The communication signals 421 between the Digital ASIC 420 and the Power management ASIC 440 are used for bi-directional communication between these two components.

The current WPC standards do not define any other ping signal than these two analog and digital pings 351, 352, but any other signal having the same features can be used in the present invention as well.

According to the present invention few HW are to be changed to the existing design of RX ICs 450. The analog ping period is short (<100 us) and the provided energy to RX IC is low. Therefore, the battery or the I/O supply voltage is offered to the RX IC in order to the provide status signal or interrupt signal to the handset processor when the TX pad or the wireless charger transmitter 460 is in standby and not providing enough power e.g. to keep open drain output at 'low' level. Also A/D converter, comparator or some other circuitry may be added to detect the analog and/or digital pinging pulse. Since one benefit is to reduce power consumption of the handset in standby mode to the lowest level as possible, the presence detection of the handset or the electrical device may not consume more than few µAs from the battery or the I/O supply voltage.

Low standby power consumption is especially useful with the wireless charging case since the charging efficiency itself is already lower in comparison to the wired charging case. End users are encouraged to keep their phones on charger pads, and therefore it is useful to save energy as much as possible. The handset may also suffer from thermal heating when battery is fully charged the TX pad is not switched to standby mode. By implementing the present invention, the green values can be achieved and at the same time the correct charging indications can be shown to end user in order to have a more friendly user interface environment.

Any type of analog or digital signals can be used as long it can detect the motion of the handset or the electrical device. The analog and digital ping signals can be for instance generated from a wireless charger transmitter or a wireless charger pad as long as it can detect the presence of the handset or the electrical device nearby the wireless charger pad or as long as it can the motion of the handset or the electrical device. The combination of both the analog and digital signals is used in the exemplary embodiment.

In this example of illustration, the digital ASIC 420 which can monitor the communication signals 421 transmitted or received from the power management ASIC 440 is also connected to a Display 430.

On the other side, a wireless charger receiver or a connection-less charging system or RX IC 450 is connected to a power management ASIC or power controller 440 which in turn is connected to the digital ASIC 420.

The Digital ASIC 420 may be a processor of the handset or the electrical device and it is able to control all peripheral components. The Digital ASIC 420 may also contain execution code for performing certain programs or for executing instructions code. The Digital ASIC 420 communicates with the Power management ASIC 440 through a bi directional bus carrying communication signals 421.

The power management ASIC 440 monitors the energy of the handset or electrical device and can for instance compare the power level of the handset battery to the recharging threshold. For example, the power management ASIC 440 can monitor the charging process of the peripherals such as the display 430, the digital ASIC 420 etc.

The wireless charger receiver or the connection-less charging system 450 may include a coil 451 which is used to transfer energy from the wireless charger or the connection-less charging system to the power management ASIC 440 of the device in order to perform the wireless charging.

As previously mentioned, the wireless charger may be of any type of connection-less charging system receiving power from a power source. For example, the wireless charging receiver 450 may be inductively coupled to the wireless charger transmitter 460. The system may also provide resonant inductively coupling between the primary and secondary coils 461 and 451. The wireless charger or the connection-less charging system is able to convert the received power into a power signal that could be received by a transducer circuit of the handset. The transducer is able to convert the power signal into a form of energy that could be stored in the handset battery. Such power signal capable of transporting energy without requiring connection or physical structure is known in the art.

The Supply voltage (VBAT/IO voltage) signal 441 is the VBAT or the I/O supply voltage signal received from the power management ASIC 440. Its status can be either Inactive which means there is No voltage supply or Active which means there is a Supply voltage.

The WC receiver enable signal 442 is driven by the Power management ASIC and it is used to enable the RX IC or set it to the standby mode. It is also indicative of a State of the Wireless Charger receiver. Its status can be Enabled which means the WC receiver is on and ready for communication and to start the charging process with TX PAD or the wireless charger transmitter 460. Its status can also be Standby which means the WC receiver is on standby mode. In which case, it is not possible to initiate communication and be in the charging process with TX PAD when WC receiver is on Standby mode.

The Power output signal 451 is the Power output of the WC receiver. Its status can be No supply which means the Handset is not on the TX PAD or the wireless charger transmitter 460, which means that the wireless charging not ongoing. Its status can also be Active which means the Handset is on the TX PAD, which means the wireless charging is ongoing.

The Status signal 452 is the Status signal received from the WC receiver. Its status can be Inactive, which means the Handset is not on the TX PAD. Its status can also be Active, which means the Handset is on the TX PAD or the wireless charger transmitter 460.

The following table 1 illustrates the different status Active/Inactive or Enabled/Standby of the different signals mentioned above and the different states of the components in FIG. 4.

(PROM), erasable programmable memory (EPROM) and the like, and it may contain software in form of computer executable instructions.

According to further aspects of the invention, the wireless charger receiver or RX IC (450) may perform the following or contain means for performing the following:

- receiving, in a wireless power receiver 450, wireless power from a wireless power transmitter 460 of a wireless charging platform;
- transmitting, to the wireless power transmitter 460, a battery full message to indicate completed charging;
- detecting a ping signal 351, 352 sent by the wireless power transmitter 460, and determining that the wireless power receiver (450) is still located on the wireless charging platform; and
- in response to not detecting a ping signal 351, 352 during a predetermined time period, transmitting an interrupt signal (452) to a power controller (440) to indicate that the wireless charger receiver (450) is not located on the wireless charging platform According to further aspects of the invention, the wireless charger receiver or RX IC (450) may also perform: transmitting the interrupt signal in response to not detecting ping signals during a predetermined time from transmitting the battery full message Apparatus 800 may also comprise one or more radios, for example telecom radio 805, broadcast radio 806, or short-range radio 807 such as Bluetooth radio or a wireless local

TABLE 1

| | Status signal from WC receiver | State of WC receiver | Power output of WC receiver | VBAT or I/O supply voltage from power management ASIC | UI indication |
|---|---|---|---|---|---|
| Handset not on PAD | Inactive | Enabled | No supply | Inactive | Nothing |
| Handset placed to PAD (battery not full) | Inactive -> Active | Enabled | Active | Inactive | Charging! |
| Handset placed to PAD (battery full) | Inactive -> Active | Enabled -> Standby | No supply | Inactive -> Active | Battery full! |
| Handset on PAD (charging) | Active | Enabled | Active | Inactive | Charging! |
| Handset on PAD (charging -> battery gets full) | Active | Enabled -> Standby | No supply | Inactive -> Active | Battery full! |
| Handset on PAD (VBAT drops below recharge threshold -> maintenance charge started) | Active | Standby -> Enabled | Active | Active until TX starts to transmit power | Nothing |
| Handset on PAD (battery gets full -> maintenance charge ended) | Active | Enabled -> Standby | No supply | Inactive -> Active | Nothing |
| Handset removed from PAD (charging) | Active -> Inactive | Enabled | No supply | Inactive | Battery status e.g. 70% full |
| Handset removed from PAD (battery full) | Active -> Inactive | Standby -> Enabled | No supply | Inactive | Battery full! |
| Handset removed from PAD (maintenance charge ongoing) | Active -> Inactive | Enabled | No supply | Inactive | Battery full! |

Figure 5:
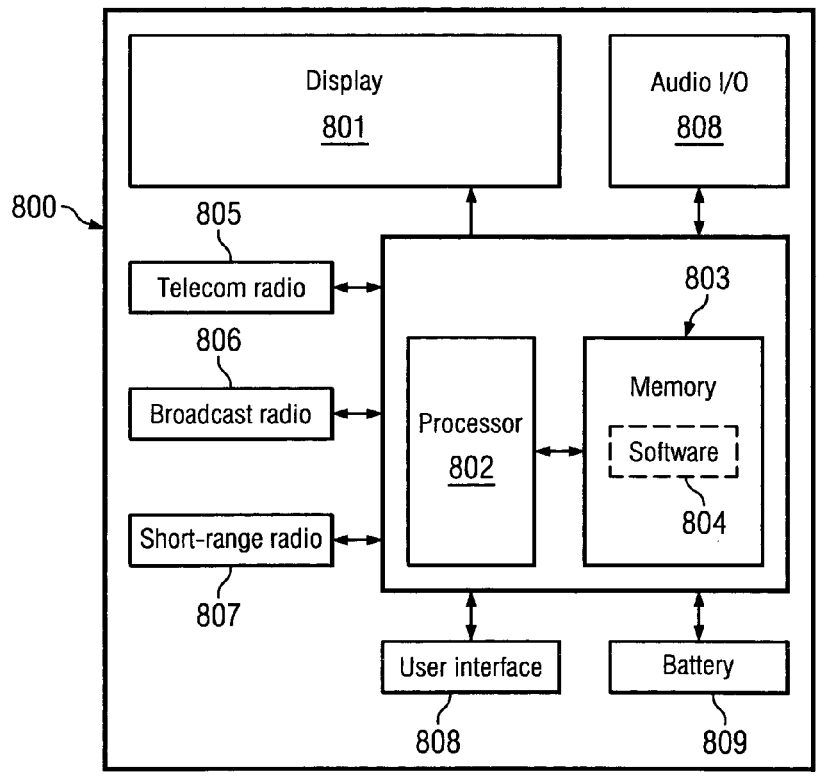
FIG. 5 presents an exemplary apparatus where one or more embodiments of the invention may be implemented

FIG. 5 presents an exemplary apparatus where one or more embodiments presented herein may be implemented. Apparatus 800 may include at least one processor 802 in connection with at least one memory 803 or other computer readable media. Memory 803 may be any type if information storing media including random access memory (RAM), read-only memory (ROM), programmable readable memory area network (WLAN) radio. Apparatus 800 may further comprise a user interface 808, display 801, and audio input/output 808 for communicating with the user. The apparatus may also comprise a battery for delivering power for various operations performed in the device.

Embodiments of the present invention may be implemented in software, hardware, application logic or a combination of software, hardware and application logic. If desired, part of the software, application logic and/or hardware may reside on FIGS. 1, 2, 3B, and 4. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    at least one processor; and
    at least one memory including computer program code,
    the at least one memory and the computer program code configured to, with the at least one processor, cause the apparatus at least to:
        initiate a wireless charging and send a charging notification to an end user;
        send a battery full message for notifying the end user when a battery is charged to a full voltage by the wireless charging and terminating the wireless charging;
        set the apparatus to a standby mode and monitor a ping signal from a wireless charger transmitter to detect whether the apparatus is removed from the wireless charger transmitter;
        enter a maintenance charging mode without sending the charging notification to the end user, when a voltage of the battery drops from the full voltage to below a recharging threshold; and
        continue the maintenance charging mode of the apparatus until the battery is charged to the full voltage or the apparatus is removed from the wireless charger transmitter.

2. The apparatus of claim 1, wherein the at least one memory and the computer program code are configured to, with the at least one processor, cause the apparatus to:
    initialize a wireless receiver to provide an interrupt signal when not detecting the ping signal during a predetermined time interval.

3. The apparatus of claim 2, wherein the at least one memory and the computer program code are configured to, with the at least one processor, cause the apparatus to:
    send the battery full message to the end user when the apparatus is removed from the wireless charger transmitter while in the standby mode, responsive to the interrupt signal.

4. The apparatus of claim 2, wherein the at least one memory and the computer program code are configured to, with the at least one processor, cause the apparatus to:
    provide the interrupt signal in response to not detecting the ping signal within the predetermined time interval from the sending the battery full message.

5. A computer program product comprising a computer-readable medium bearing computer program code embodied therein for use with a computer, the computer program code comprising:
    code for initiating a wireless charging in a wireless charging device and sending a charging notification to an end user;
    code for sending a battery full message for notifying the end user when a battery of the wireless charging device is charged to a full voltage by the wireless charging and terminating the wireless charging;
    code for setting the wireless charging device to a standby mode and monitoring a ping signal from a wireless charger transmitter to detect whether the wireless charging device is removed from the wireless charging transmitter;
    code for entering a maintenance charging mode without sending the charging notification to the end user, when a voltage of the battery drops from the full voltage to below a recharging threshold; and
    code for continuing the maintenance charging mode of the wireless charging device until the battery is charged to the full voltage or the wireless charging device is removed from the wireless charger transmitter.

6. A computer-readable medium encoded with instructions that, when executed by a computer, perform:
    initiating a wireless charging in a wireless charging device, and sending a charging notification to an end user;
    sending a battery full message for notifying the end user when a battery of the wireless charging device is charged to a full voltage by the wireless charging, and terminating the wireless charging;
    setting the wireless charging device to a standby mode and monitoring a ping signal from a wireless charger transmitter to detect whether the wireless charging device is removed from the wireless charging transmitter;
    entering a maintenance charging mode without sending the charging notification to the end user, when a voltage of the battery drops from the full voltage to below a recharging threshold; and
    continuing the maintenance charging mode of the wireless charging device until the battery is charged to the full voltage or the wireless charging device is removed from the wireless charger transmitter.

* * * * *